(12) United States Patent
Buescher (10) Patent No.: US 7,040,092 B1
(45) Date of Patent: May 9, 2006

(54) CENTER SECTION FOR HYDRAULIC TRANSMISSION

(75) Inventor: Ryan S. Buescher, Neoga, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/970,260

(22) Filed: Oct. 21, 2004

(51) Int. Cl.
*F16D 39/00* (2006.01)

(52) U.S. Cl. .......................... 60/489; 60/487
(58) Field of Classification Search ............ 60/487, 60/489
See application file for complete search history.

(56) References Cited

U.S. PATENT DOCUMENTS

| 4,903,545 | A | 2/1990 | Louis et al. |
|---|---|---|---|
| 5,314,387 | A | 5/1994 | Hauser et al. |
| 5,505,279 | A | 4/1996 | Louis et al. |
| 6,122,996 | A | 9/2000 | Hauser et al. |
| 6,301,885 | B1 | 10/2001 | Johnson et al. ............... 60/487 |
| 6,715,283 | B1 | 4/2004 | Abend et al. ................. 60/487 |

*Primary Examiner*—F. Daniel Lopez
(74) *Attorney, Agent, or Firm*—Neal, Gerber & Eisenberg LLP (57) ABSTRACT

A two piece center section assembly for mounting inside the housing of a hydrostatic drive apparatus is disclosed. The assembly includes separate pump and motor support portions where the check valve is formed between the two pieces. Fasteners extend through the two pieces and into the housing for the drive apparatus to secure the assembly thereto without the need for additional fasteners. The need for additional sealing material between the pump and motor portions can also be reduced by the use of raised portions on the mating surfaces between these two portions.

24 Claims, 12 Drawing Sheets

FIG. 15
PRIOR ART

CENTER SECTION FOR HYDRAULIC TRANSMISSION

BACKGROUND OF THE INVENTION

This invention relates to a center section for use in a hydrostatic transmission ("HST") or an integrated hydrostatic transaxle ("IHT").

The invention disclosed herein is an improved center section for use in an IHT or an HST, where the center section is of a two-piece design. Center sections containing hydraulic porting for connecting a rotating hydraulic pump and motor are known in the art and are disclosed in, e.g., commonly owned U.S. Pat. Nos. 5,314,387 and 6,122,996, the terms of which are incorporated herein by reference.

Two-piece center sections for use in an IHT are also known. For example, different two-piece center section designs are disclosed in the file history for U.S. Pat. No. 5,505,279 and other patents claiming priority from U.S. Pat. No. 4,903,545. These designs included two separate pieces, one for the motor running surface and one for the pump running surface, and the two pieces were bolted together at a right angle to one another for insertion into an integrated hydrostatic transaxle housing. Two of these known prior art designs are shown in FIGS. 12–15.

Figure 12:
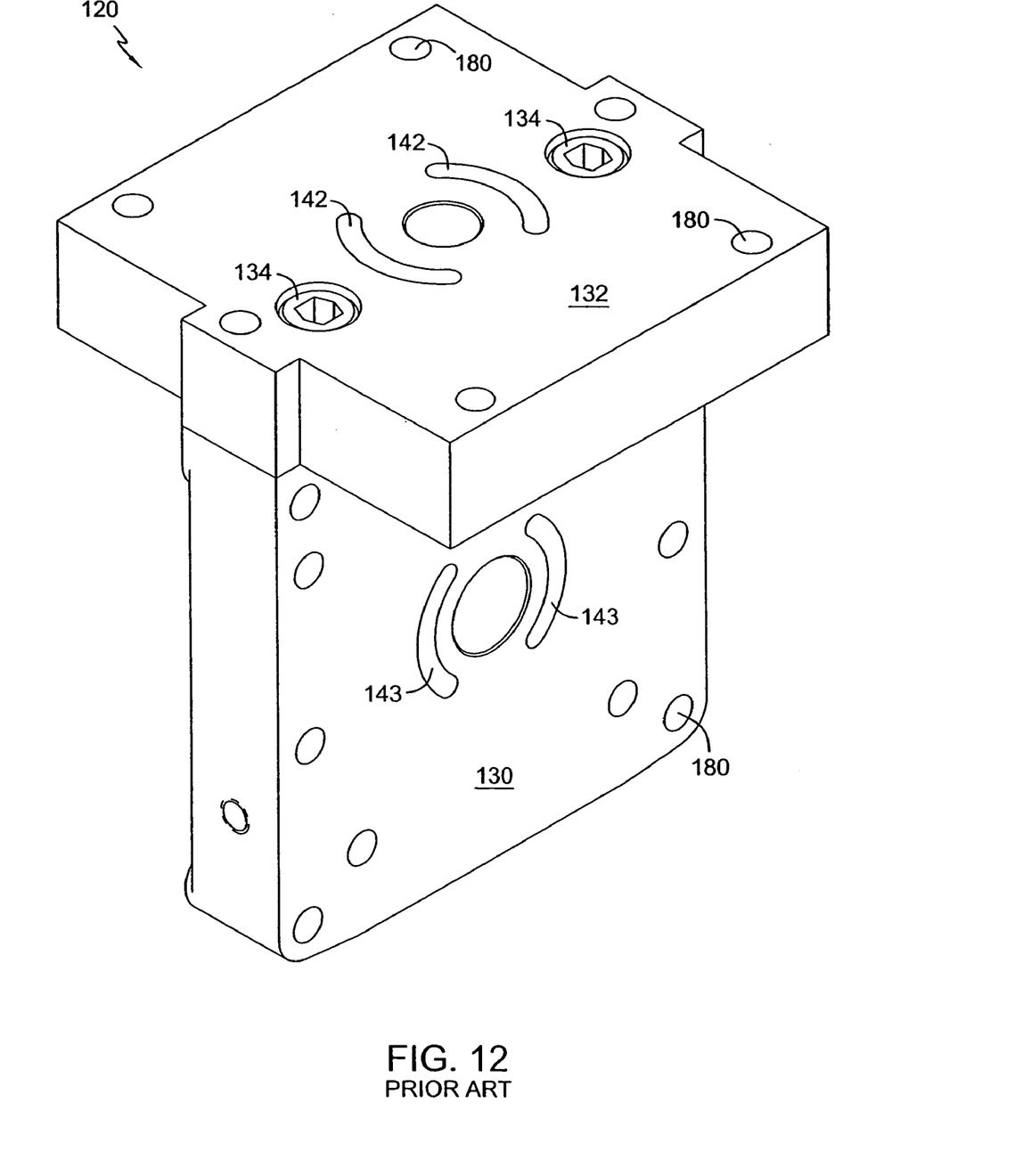
FIG. 12 is a perspective view of a first prior art two-piece center section.
Figure 13:
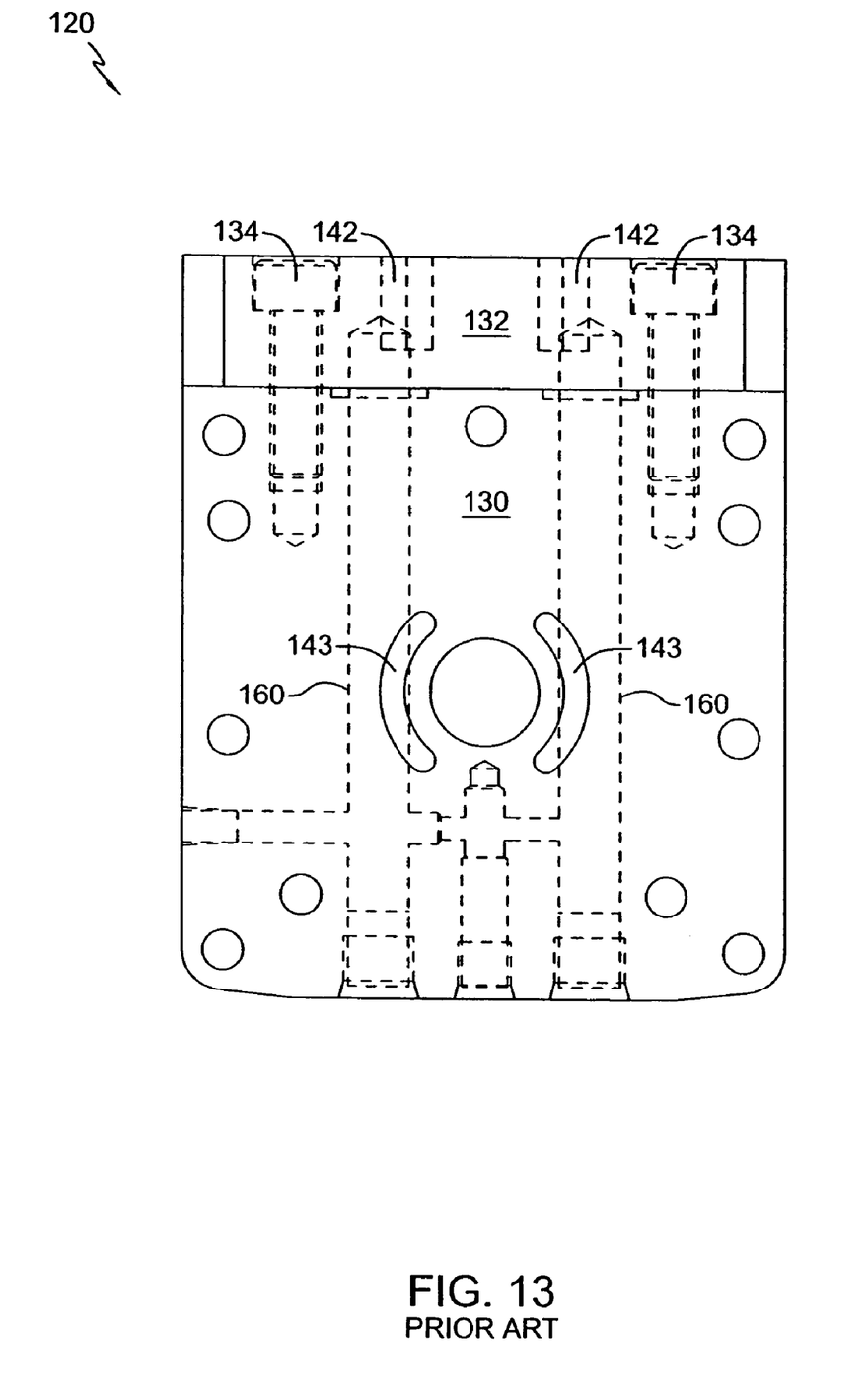
FIG. 13 is a plan view of the prior art center section shown in FIG. 12.

The first prior art design in FIGS. 12 and 13 shows a two piece center section 120 having a pump portion 130 and a motor portion 132 bolted together by two bolts 134. Separate openings 180 are shown for bolting center section 120 into an integrated hydrostatic transaxle such as that shown in U.S. Pat. No. 4,903,545. Pump kidneys 143 and motor kidneys 142 are hydraulically connected via porting 160 to connect the hydraulic pump cylinder block and motor cylinder block (not shown) of the integrated hydrostatic transaxle.

Figure 14:
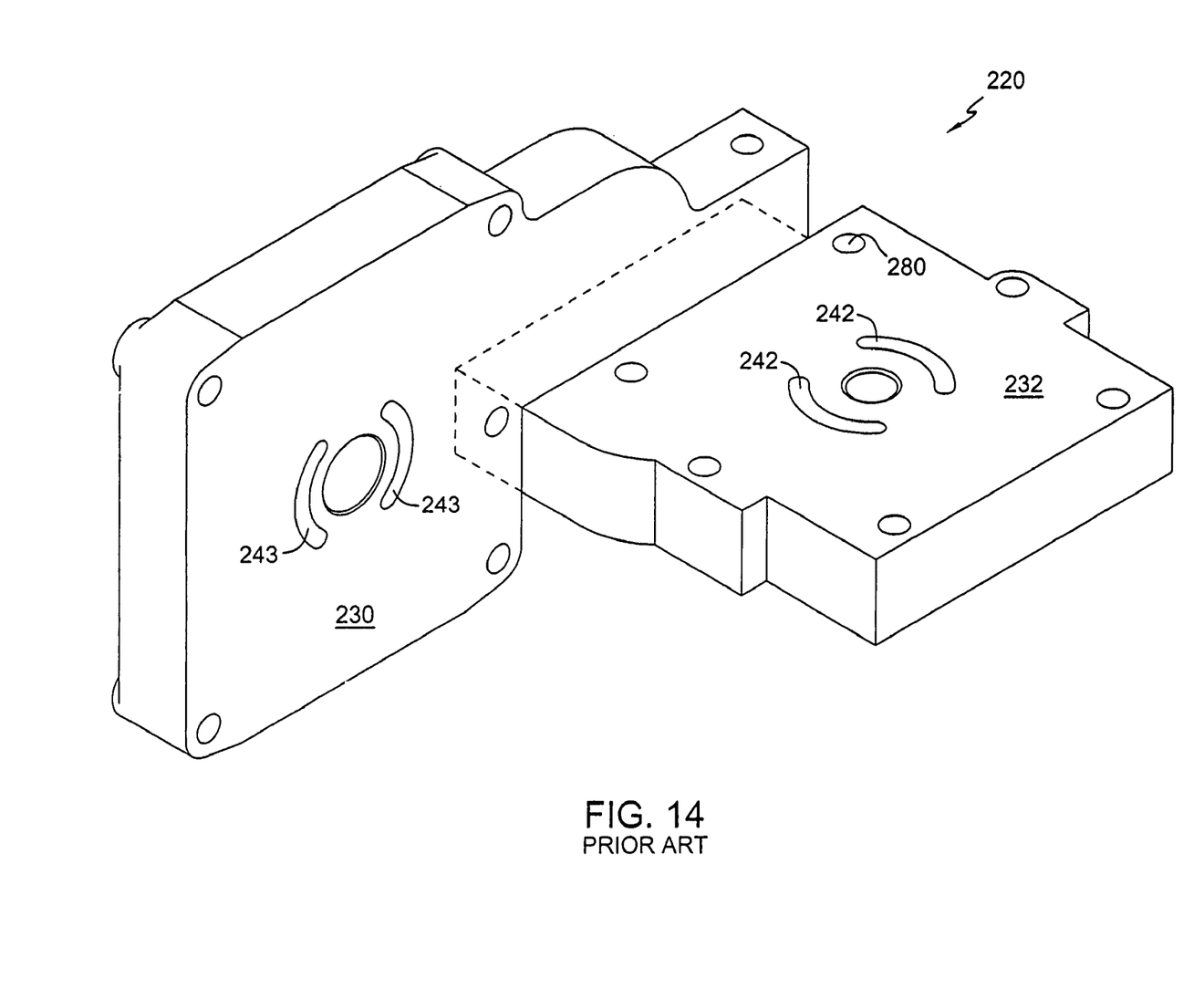
FIG. 14 is a perspective view of a second prior art two-piece center section.
Figure 15:
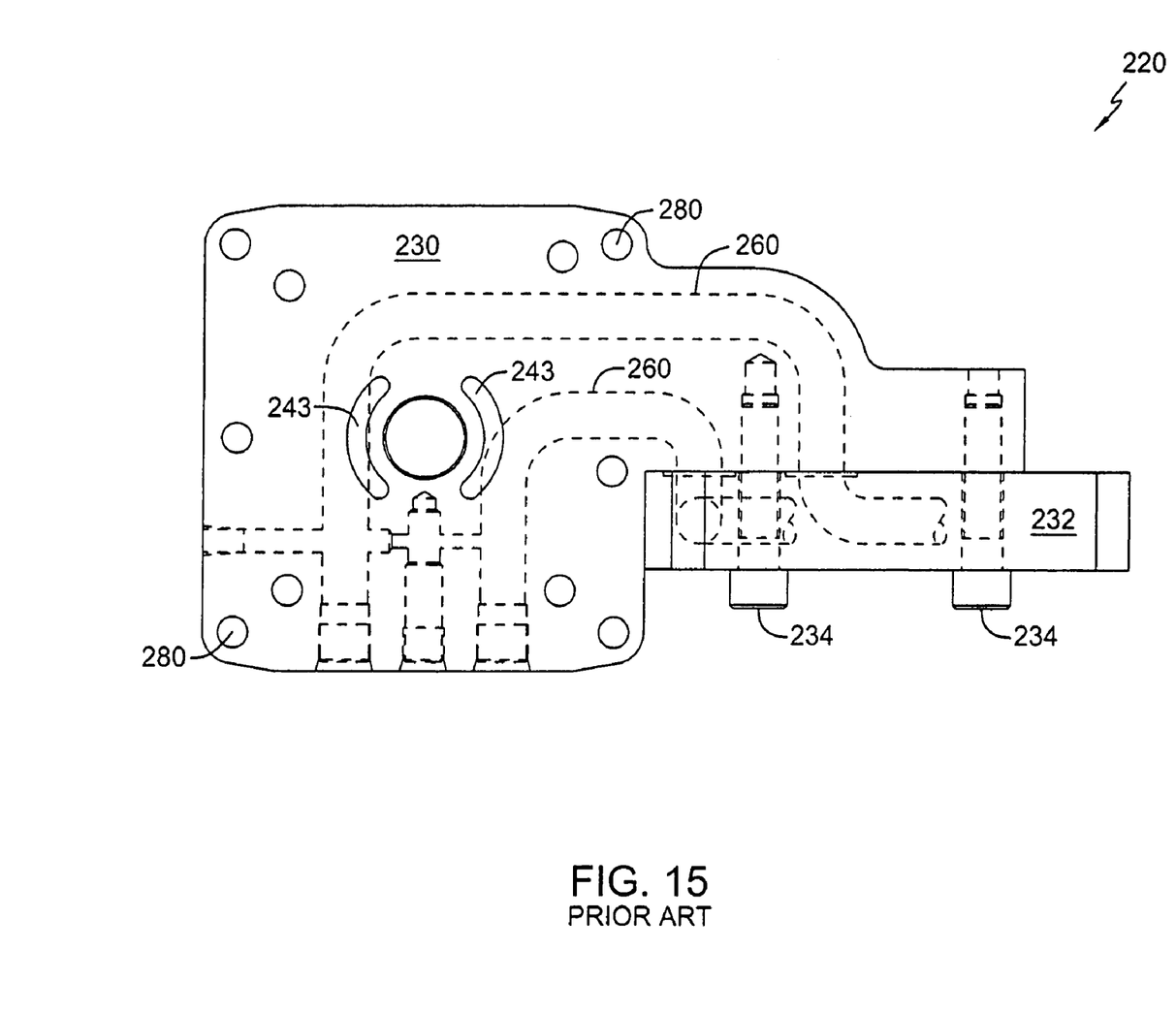
FIG. 15 is a plan view of the prior art center section shown in FIG. 14.

FIGS. 14 and 15 show a similar but slightly different two piece center section 220 where pump portion 230 is bolted to motor portion 232 by bolts 234. Again, hydrostatic porting 260 is formed therein to connect pump kidneys 243 and motor kidneys 242. Separate fasteners (not shown) are needed to secure two piece center section 230 to the transaxle housing via openings 280. It is understood that the pump portions and motor portions in both of these prior art designs can be reversed.

SUMMARY OF THE INVENTION

The subject invention is an improvement over these prior art two-piece center section designs. In particular the disclosed invention discloses an improved method for assembling and mounting a two-piece center section in a transmission housing. It also discloses an improved check valve design.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
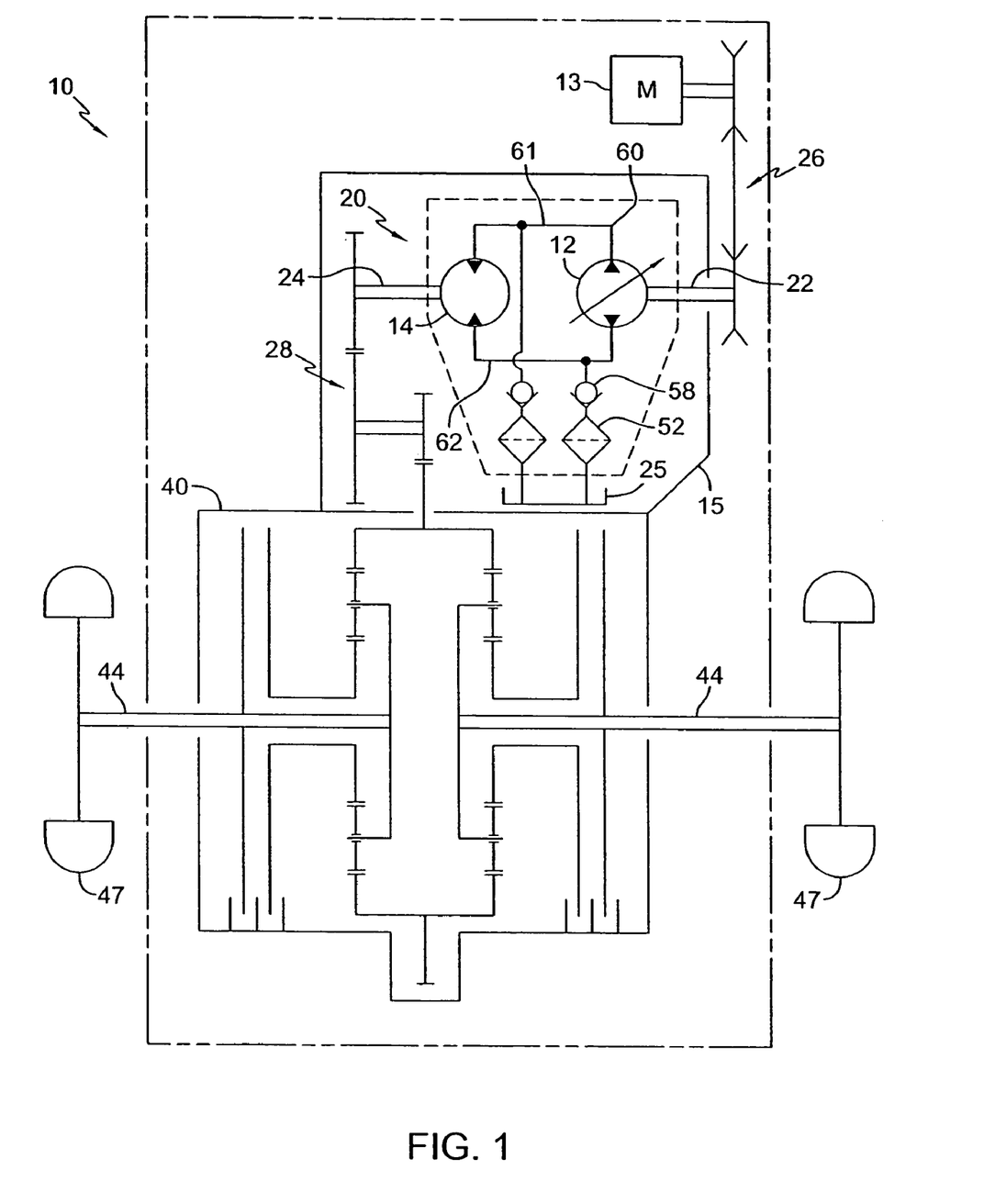
FIG. 1 is a schematic of an exemplary vehicle incorporating a center section assembly in accordance with the present invention.

An exemplary vehicle 10 is shown in FIG. 1 where hydrostatic transmission 15 comprises pump 12 and motor 14 mounted on center section 20. Sump 25 is formed inside transmission 15 to hold the hydraulic fluid for the operation of pump 12 and motor 14.

Figure 2:
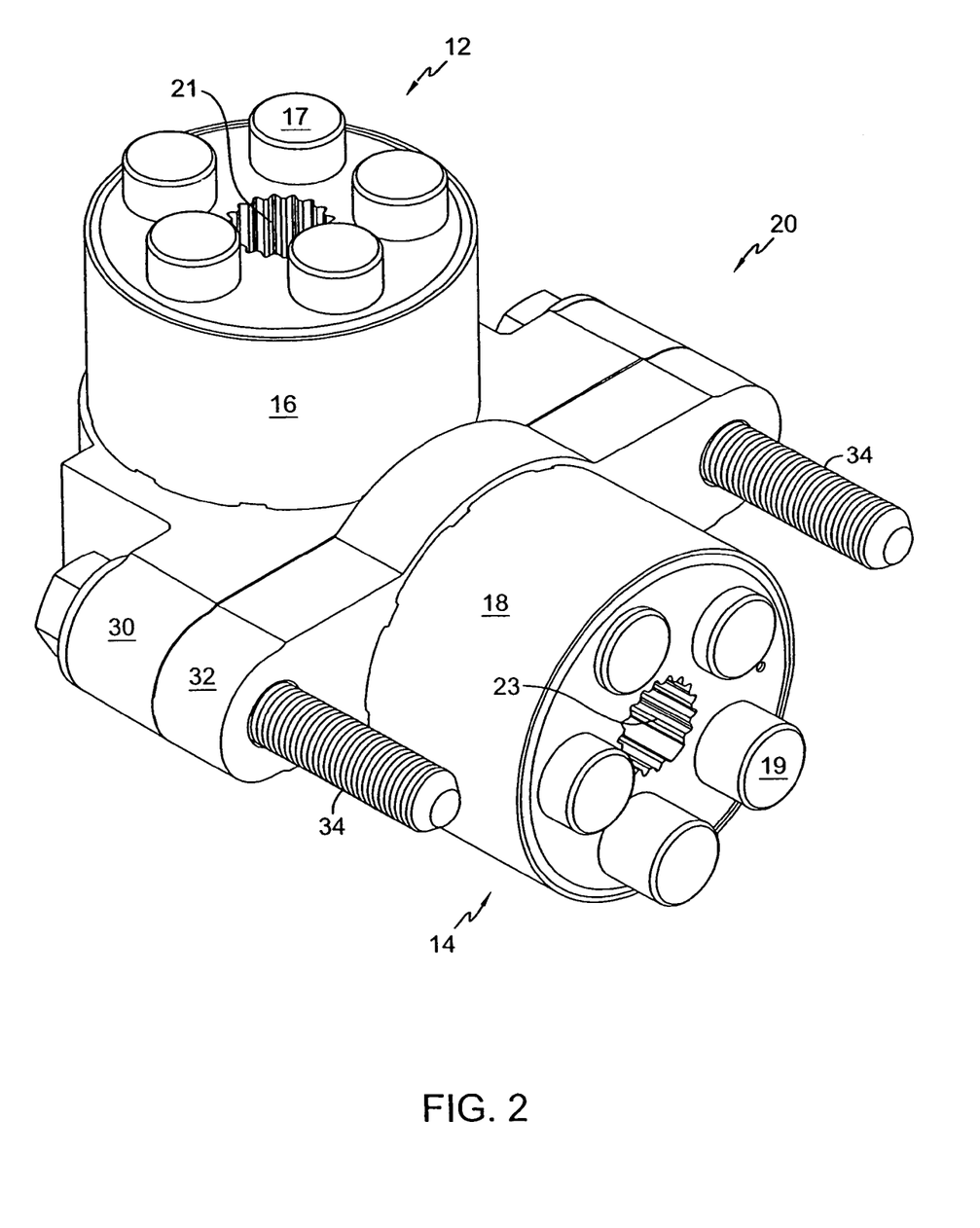
FIG. 2 is a top perspective view of a two-piece center section in accordance with the subject invention and including rotating cylinder blocks mounted thereon.
Figure 3:
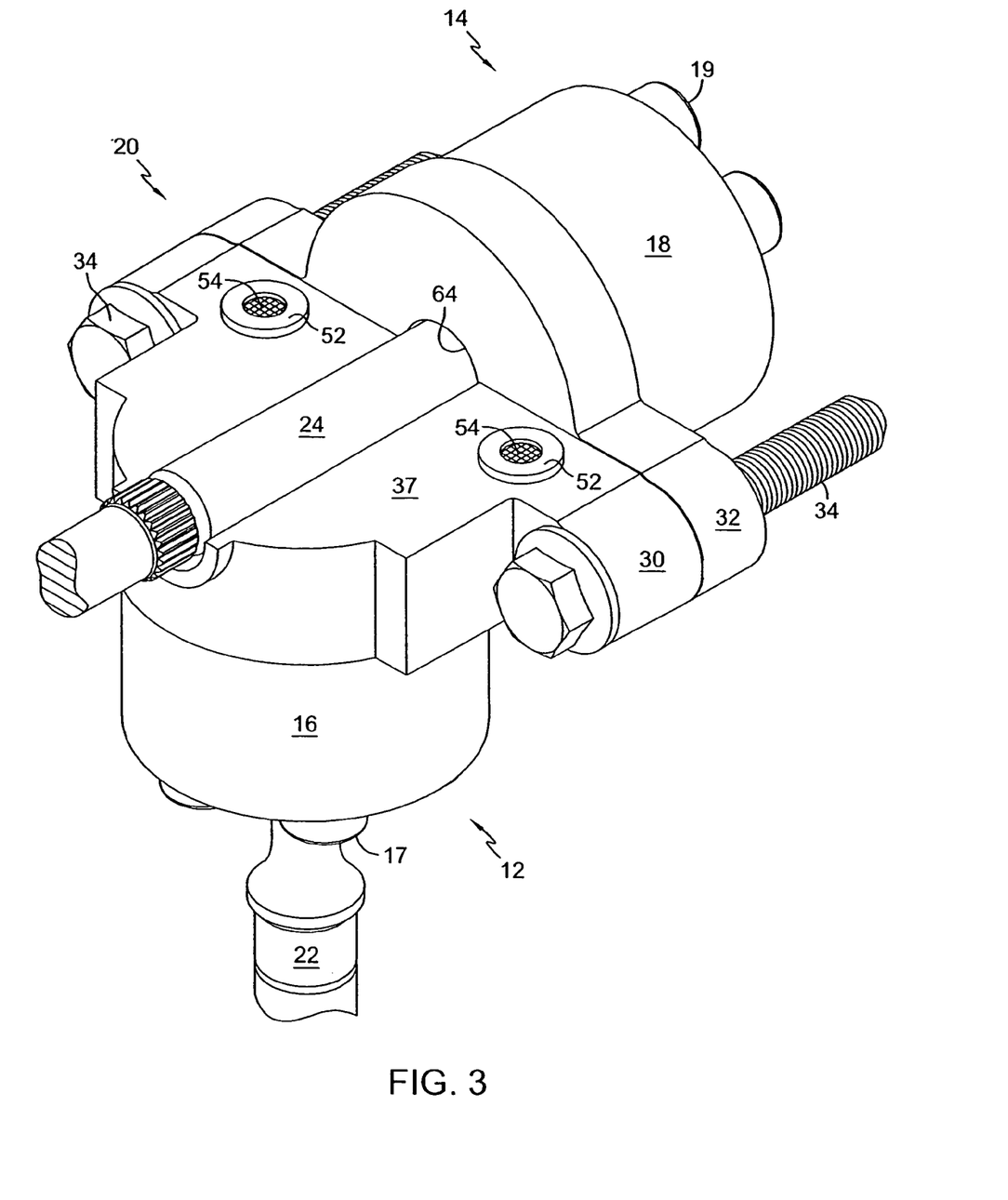
FIG. 3 is a bottom perspective view of the assembly shown in FIG. 2.
Figure 4:
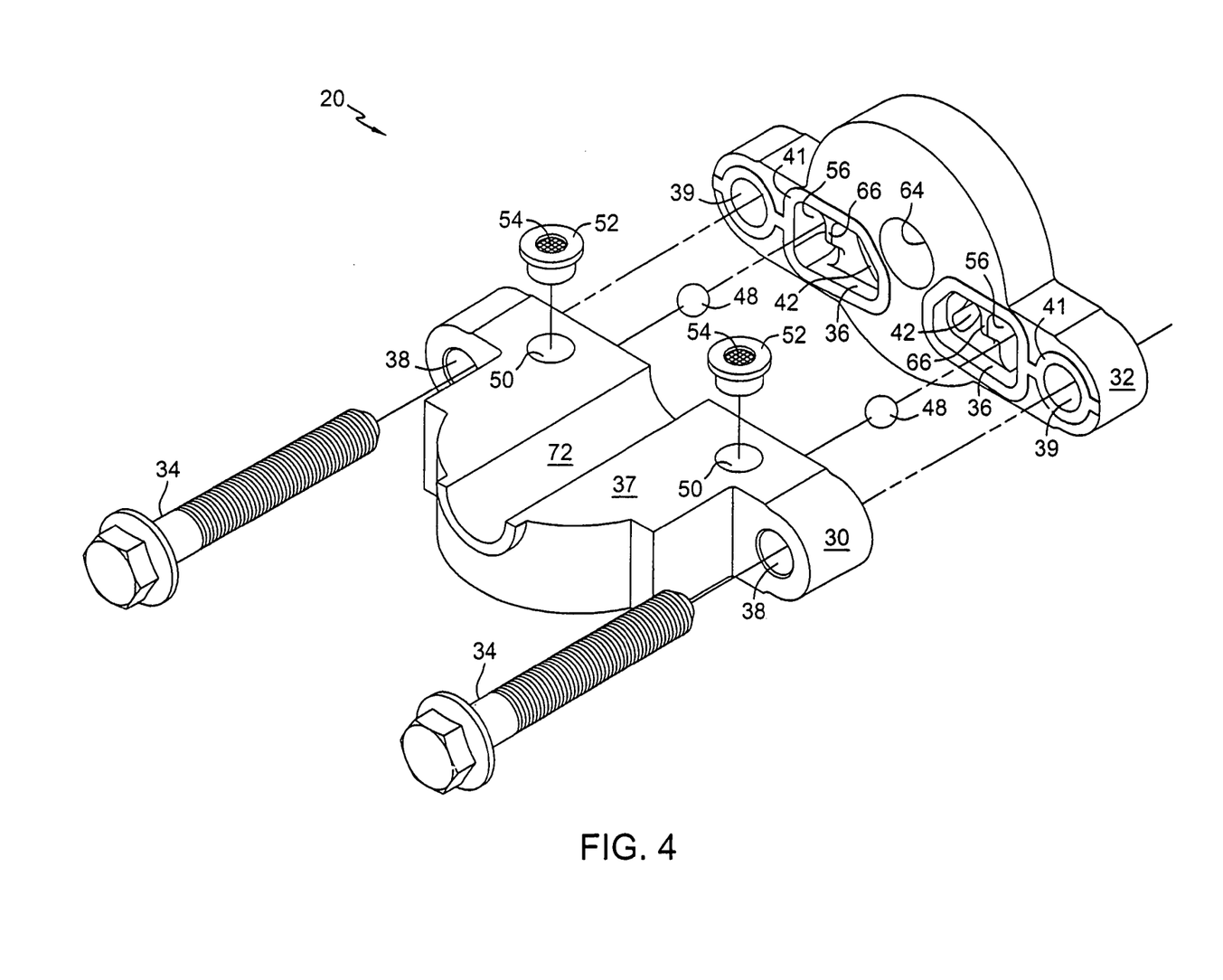
FIG. 4 is an exploded perspective view of a center section in accordance with the subject invention.

As shown, e.g., in FIG. 2, hydraulic pump 12 comprises a rotatable cylinder block 16 having a plurality of axially movable pistons 17 mounted therein. A spline engagement 21 is formed to drive rotatable cylinder block 16 through pump input shaft 22. Similarly, motor 14 comprises a rotatable cylinder block 18 having a plurality of axially moving pistons 19 mounted therein. A spline portion 23 is engaged to drive motor output shaft 24.

Prime mover 13 is also mounted on vehicle 10 and drives pump input shaft 22 through a pulley arrangement 26. Motor output shaft 24 drives gear train 28 which is engaged to differential 40 which, in turn, drives output axles 44 and wheels 47. The specific details of exemplary vehicle 10 and various details of the hydrostatic transmission 15 are not critical to this invention and will not be shown or discussed in detail.

Center section 20 is comprised of two portions, namely a pump portion 30 secured to motor portion 32 by means of fasteners 34, which are depicted herein as bolts. Fasteners 34 extend through openings 38 in pump section 30 and openings 39 in motor section 32. Fasteners 34 are also used to secure center section 20 to transmission housing 27.

Figure 11:
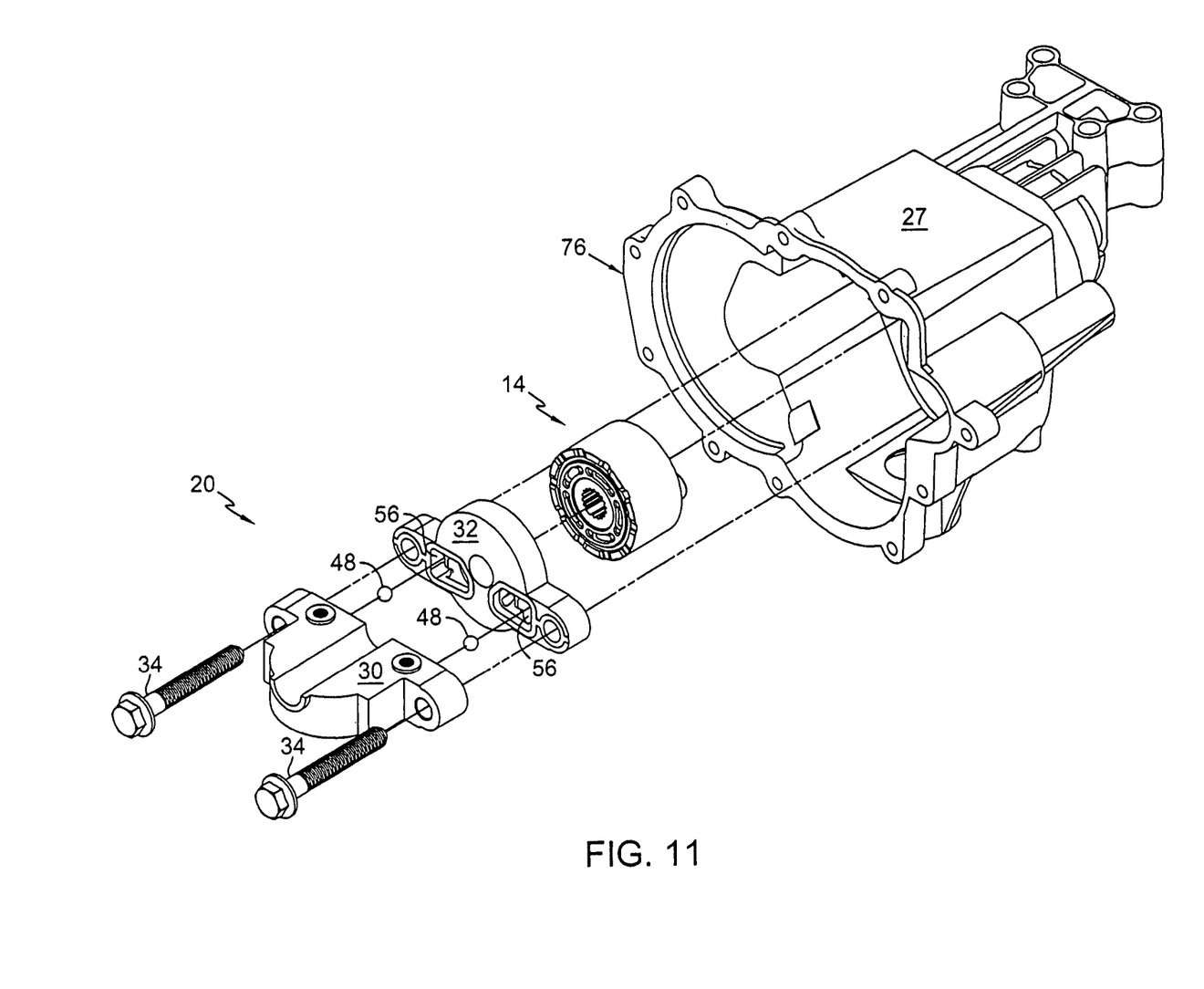
FIG. 11 is an exploded perspective view of a partially assembled transmission showing a part of the housing and a center section in accordance with the present invention, with certain elements of the hydraulic drive mechanism.

It will be understood that housing 27 depicted in FIG. 11 is not a complete transmission housing; this is a vertical split design, where the housing pieces are joined at a plane perpendicular to the axis of the output axles (not shown), and another housing element (not shown) will be joined to housing 27 along the split line 76. Other housing designs can be used in accordance with the spirit of this invention.

A benefit of this design is that center section 20 may be easily assembled into housing 27. As shown in FIG. 11, motor 14 may be inserted into housing 27, followed by motor portion 32 of center section 20. Check balls 48 then may be inserted in check ball chamber 56 of motor portion 32, then pump portion 30 of center section 20 is secured to motor portion 32 using fasteners 34, which are also used to secure the entire assembly to housing 27. This eliminates a major concern with two piece center sections, which required multiple fasteners to both secure the two pieces together and additional fasteners to secure the assembled center section to the housing.

Hydraulic porting is integrally formed in center section 20 to hydraulically connect pump cylinder block 16 to motor cylinder block 18. For example, motor kidney ports 42 formed on motor running surface 33 are connected to ports 36 formed in motor section 32. These are connected to ports 45 formed in pump section 30, which in turn are connected to pump kidney ports 43 which are in communication with pump cylinder block 16.

As shown most clearly in FIG. 1, hydraulic porting 60 comprises a first pressure side 61 and a second pressure side 62, each of which connect pump 12 to motor 14, and during operation one of pressure sides 61 or 62 will be under high pressure while the opposite side will be under low pressure, often referred to as vacuum.

Porting 60 is open to sump 25 through a pair of check valves 58, shown schematically in FIG. 1, each of which is connected to one of the hydraulic pressure sides 61 or 62. In the preferred embodiment, depicted in FIGS. 3 to 10, check valves 58 comprise a pair of check openings 50 formed in bottom surface 37 of pump portion 30. The plane that is formed by bottom surface 37 and includes openings 50 intersects motor shaft 24. Plug in filters 52 comprising a mesh filter element 54 are located in check opening 50 to prevent contaminants in the hydraulic fluid from reaching porting 60.

Figure 5:
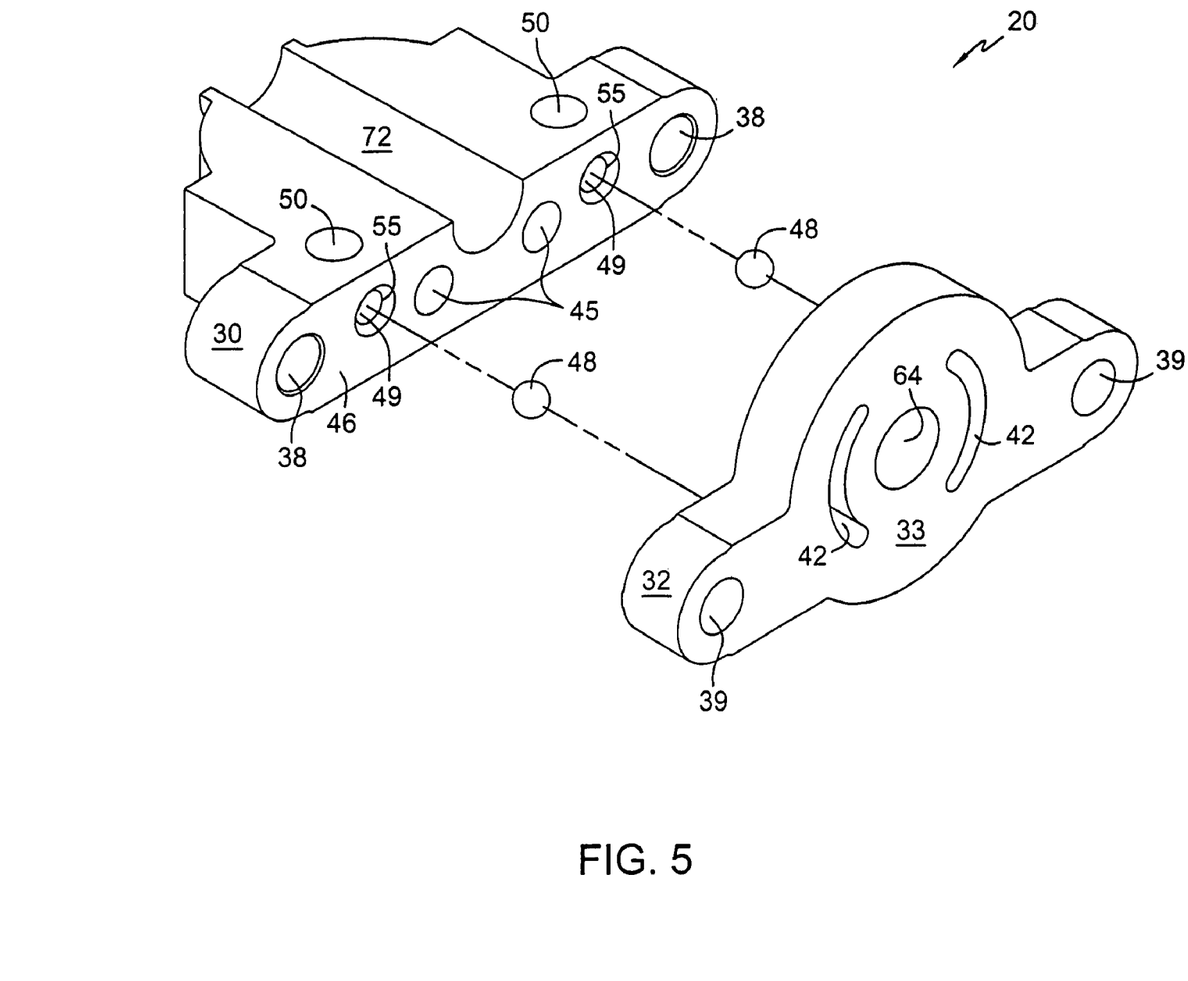
FIG. 5 is a further exploded perspective view of a portion of a center section in accordance with the subject invention.
Figure 6:
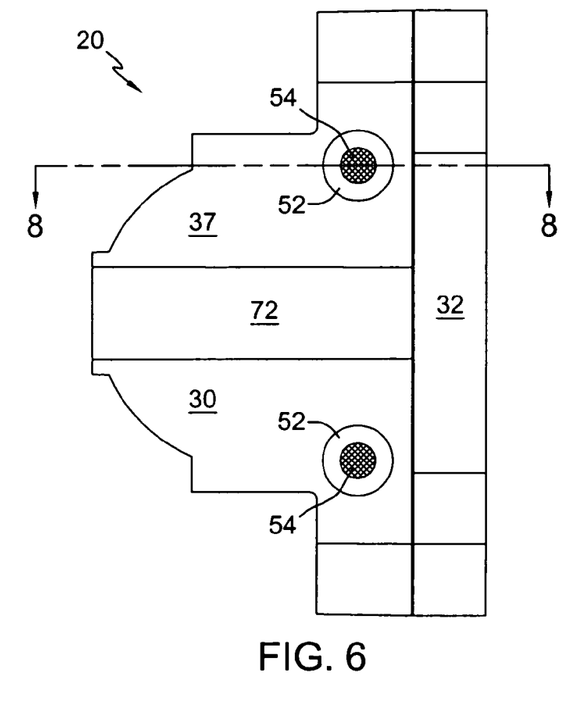
FIG. 6 is a bottom plan view of the center section shown in FIG. 2.
Figure 7:
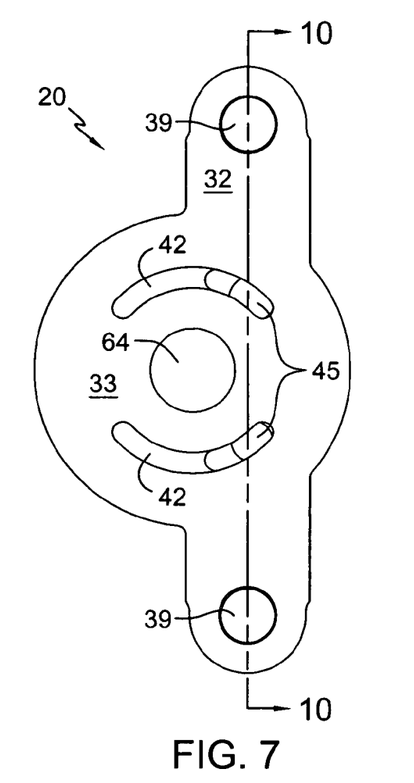
FIG. 7 is an elevational end view of the center section shown in FIG. 6.
Figure 8:
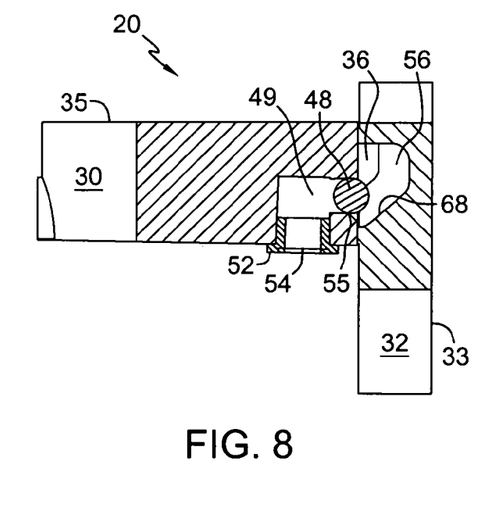
FIG. 8 is a cross-sectional elevational side view of the center section shown in FIG. 6 along the lines 8—8, with the check valve in the closed position.
Figure 9:
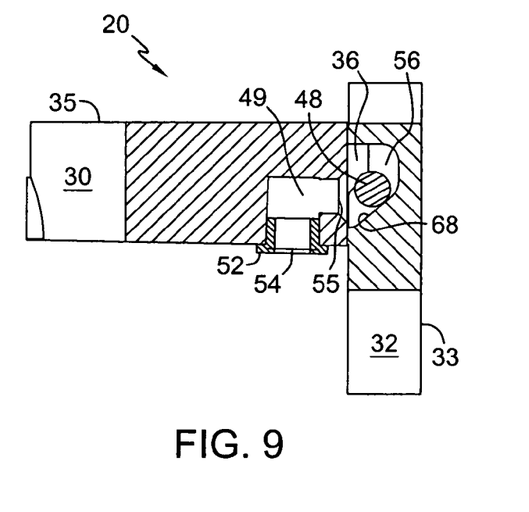
FIG. 9 is a cross-sectional elevational side view of the center section similar to that in FIG. 8 with the check valve in the open position.
Figure 10:
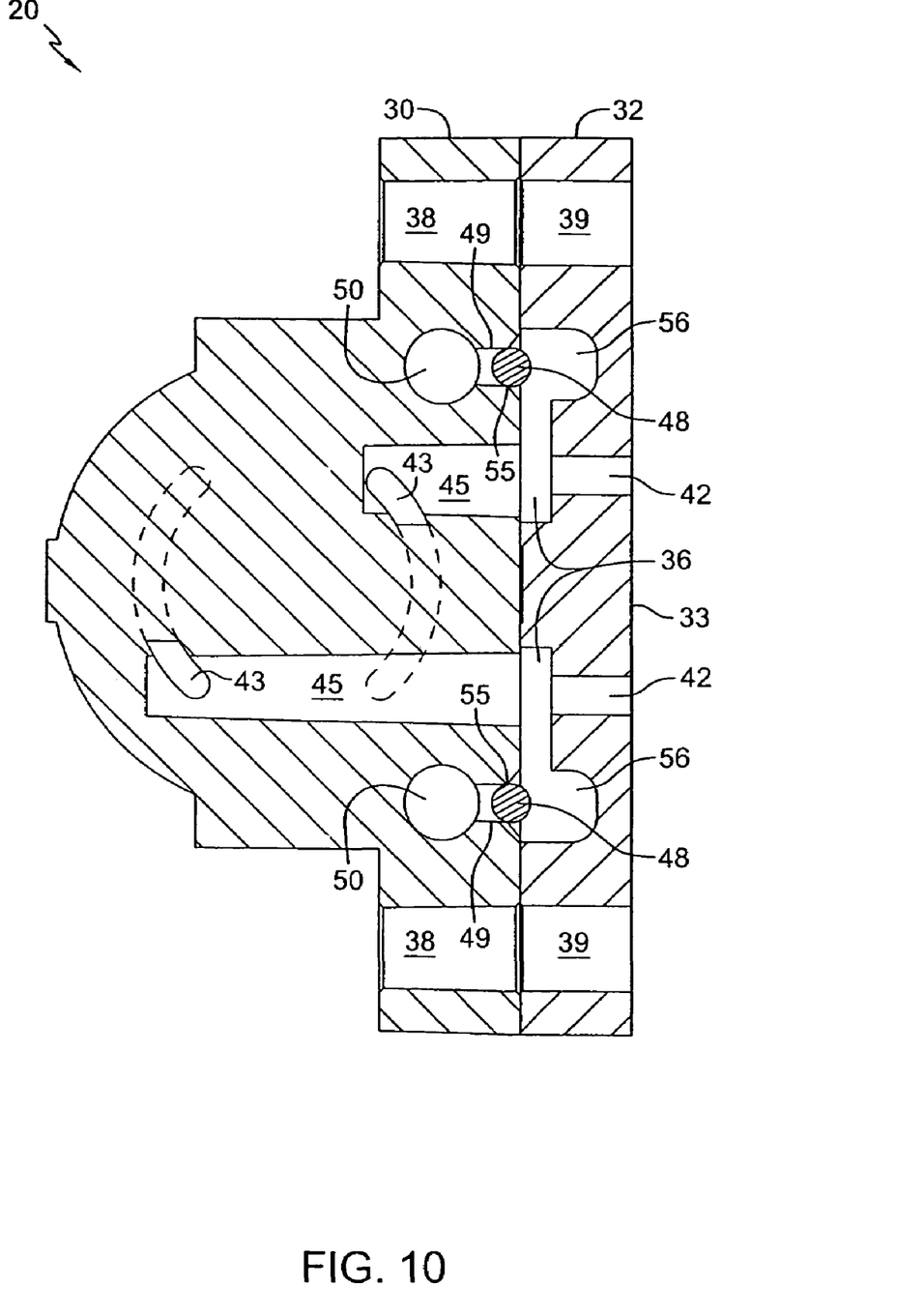
FIG. 10 is a cross-sectional plan view of the center section shown in FIG. 7, along the lines 10—10.

Check balls 48 are mounted in respective check ports 49 as shown in FIG. 5 to control the intake of fluid through check openings 50. While the use of check plugs in general is known in the art and will not be described in detail, the present invention simplifies the assembly of the overall unit. A benefit of the simplified design shown herein is that gravity acts to locate check ball 48 in the area of seat 55. When center section 20 is assembled, check balls 48 are sandwiched between pump section 30 and motor section 32 as shown most clearly in FIGS. 8 and 9. In FIG. 8, check ball 48 is against seat 55 to close check port 49 from the rest of hydraulic circuit 60. This would correspond to this respective side of hydraulic circuit 60 being under pressure. In FIG. 9, on the other hand, check ball 48 is lifted off seat 55 to permit hydraulic fluid to flow through check opening 50 to passage 49 and thus to hydraulic circuit 60. This is accomplished when that side of hydraulic circuit 60 is under low pressure or vacuum.

A ramp 68 is formed in motor port 36 to guide check ball 48 to the area of seat 55, which permits gravity to assist in seating the balls. This design eliminates the need for a separate check plug assembly which must be inserted into the center section. It also permits the check plugs to be formed between pump portion 30 and motor portion 32 of center section 20, as opposed to being entirely formed within a single component. A rib 66 is formed in port 36 to locate check ball 48 in check ball chamber 56 and to keep it from interfering with motor kidney 42. Seat 55 is preferably located as that it is below pump running surface 35 and above the center axis of motor shaft 24.

Motor shaft 24 extends through opening 64 in motor section 32 and may be at least partially supported by the bottom surface 37 of pump section 30 or by a separate bearing on the transmission housing. A recess 72 is formed on bottom surface 37 to provide clearance for motor shaft 24.

A benefit of the present invention is that it eliminates the need for sealant or a gasket between pump section 30 and motor section 32. This is preferably accomplished by providing a raised area 41 that is preferably machined, and surrounds both motor porting 36 as well as bolt openings 39. When the unit is assembled, raised surface 41 contacts engagement surface 46 on pump section 30, providing sufficient contact to minimize leakage. It will be understood that a certain level of leakage is permissible due to the location of center section 20 in sump 25, but excessive leakage can diminish performance of the unit.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A center section assembly for mounting inside the housing of a hydrostatic drive apparatus, comprising:
   a pump support portion comprising a pump running surface and a first mating surface;
   a motor support portion comprising a motor running surface and a second mating surface;
   hydraulic porting comprising:
      a pair of pump kidney ports formed on the pump running surface;
      a first pair of hydraulic ports formed in the pump support portion, where each of the first pair of hydraulic ports has a first end open to one of the pump kidney ports and a second end open at the first mating surface;
      a pair of motor kidney ports formed on the motor running surface; and
      a second pair of hydraulic ports formed in the motor support portion, where each of the second pair of hydraulic ports has a first end open to one of the motor kidney ports and a second end open at the second mating surface, whereby each of the second ends of the first pair of hydraulic ports is open to a corresponding second end of the second pair of hydraulic ports; and
   a raised surface formed on one of the first mating surface or the second mating surface to contact the opposite mating surface when the pump portion is joined to the motor portion whereby the raised surface assists in sealing the hydraulic porting.

2. A center section assembly as set forth in claim 1, further comprising a check valve configuration located between the pump support portion and the motor support portion wherein the raised surface generally surrounds the check valve.

3. A center section assembly as set forth in claim 1, further comprising:
   a first set of fastener openings formed in the pump support portion and a second set of fastener openings formed in the motor support portion;
   a first fastener extending through one of the first set of fastener openings and one of the second fastener openings and into the housing of the hydrostatic drive apparatus to assist in securing the center section assembly to the housing; and
   a second fastener extending through another of the first set of fastener openings and another of the second fastener openings and into the housing of the hydrostatic drive apparatus to assist in securing the center section assembly to the housing.

4. A center section assembly as set forth in claim 3, wherein the fastener openings extend generally perpendicular to the motor running surface.

5. A center section assembly as set forth in claim 3, wherein the fastener openings extend generally perpendicular to a housing split line.

6. A center section assembly for mounting inside the housing of a hydrostatic drive apparatus wherein the housing forms a sump, the center section assembly comprising:
a pump support portion comprising:
first and second ports formed therein;
a pump running surface;
a first pump kidney port formed on the pump running surface and open to one end of the first port; and
a second pump kidney port formed on the pump running surface and open to one end of the second port;
a motor support portion secured to the pump support portion and comprising:
third and fourth ports formed therein;
a motor running surface;
a first motor kidney port formed on the motor running surface and open to one end of the third port, and a second end of the third port is open to a second end of the first port in the pump support portion to form a first side of a hydraulic circuit; and
a second motor kidney port formed on the motor running surface and open to one end of the fourth port, and a second end of the fourth port is open to a second end of the second port in the pump support portion to form a second side of a hydraulic circuit; and
a first check port in hydraulic contact with the first hydraulic side, the first check port comprising a first opening to the sump and a first check ball located between the pump support portion and the motor support portion.

7. A center section assembly as set forth in claim 6, further comprising a filter in the first opening to the sump.

8. A center section assembly as set forth in claim 7, wherein the filter comprises a plug in portion.

9. A center section assembly as set forth in claim 6, further comprising a second check port in hydraulic contact with the second hydraulic side, the second check port comprising a second opening to the sump and a second check ball located between the pump support portion and the motor support portion.

10. A center section assembly as set forth in claim 6, wherein the first opening to the sump extends in a direction parallel to the mating surfaces between the pump support portion and the motor support portion.

11. A center section assembly as set forth in claim 6, wherein the first check port further comprises a check ball seat formed in the pump support portion.

12. A center section assembly as set forth in claim 11, wherein the first check port further comprises a check ball chamber formed in the motor support portion.

13. A center section assembly as set forth in claim 12, further comprising a rib in the check ball chamber.

14. A center section assembly as set forth in claim 12, further comprising a surface angled toward the check ball seat formed in the pump support portion.

15. A center section assembly as set forth in claim 6, further comprising a set of fastener openings extending through the pump and motor support portions, wherein the fastener openings are generally parallel to the first and second ports of the pump support portion.

16. A hydrostatic drive apparatus comprising:
a housing forming a sump;
a center section assembly mounted in the sump and comprising a pump running surface for mounting a pump cylinder block and a motor running surface for mounting a motor cylinder block;
a motor shaft engaged to and driven by the motor cylinder block and extending generally through the motor running surface; and
at least one check valve seat formed in the center section, wherein the at least one check valve seat is positioned higher than the center axis of the motor shaft and lower than the pump running surface.

17. A hydrostatic drive apparatus as set forth in claim 16, wherein the center section assembly comprises a pump support section secured to a motor support section, and wherein the at least one check valve seat is located between the pump support section and the motor support section adjacent a check ball chamber in which is positioned a check ball.

18. A hydrostatic drive apparatus as set forth in claim 17, further comprising fastener openings extending through the pump support section and the motor support section, wherein fasteners inserted through the fastener openings and into the housing secure the pump support section to the motor support section and secure both sections to the housing.

19. A hydrostatic drive apparatus as set forth in claim 16, further comprising a pair of check ports formed in the center section assembly, each check port having an opening into the sump formed on a bottom surface of the center section, and wherein a plane congruent with the bottom surface of the center section intersects the motor shaft.

20. A hydrostatic drive apparatus as set forth in claim 19, further comprising a filter in each opening.

21. A center section assembly for mounting inside the housing of a hydrostatic drive apparatus wherein the housing forms a sump, the center section assembly comprising:
a pump support section;
a motor support section secured to the pump support portion;
a check valve formed by the pump support portion and the motor support portion and comprising an opening into the sump, a check valve seat formed in one of the pump support section and the motor support section and a check ball chamber formed in the other of the pump support section and the motor support section for locating a check valve ball.

22. A center section assembly as set forth in claim 21, further comprising a filter located in the opening into the sump.

23. A center section assembly as set forth in claim 21, further comprising porting adjacent the check ball chamber and a rib at least partially separating the check ball chamber from the porting.

24. A center section assembly as set forth in claim 21 further comprising a raised area on one of the pump support section and the motor support section and a flat area on the other of the pump support section and the motor support section wherein attachment of the pump support section to the motor support section causes the raised area and the flat area to contact each other so as to generally separate the check ball chamber from the sump at the interface between the pump support section and the motor support section.

* * * * *